UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF NITROGENOUS COMPOUNDS.

1,188,771.  Specification of Letters Patent.  Patented June 27, 1916.

No Drawing.  Application filed November 8, 1915. Serial No. 60,262.

*To all whom it may concern:*

Be it known that I, PAUL RALPH HERSHMAN, a citizen of Austria-Hungary, residing at Chicago, in the county of Cook and State of Illinois, have invented certain new and useful Improvements in the Production of Nitrogenous Compounds, of which the following is a specification.

One of the leading purposes of the present invention resides in the provision of a novel and improved method or process of producing nitrogenous compounds in an efficient and economical manner, such, for example, as the production of aluminum nitrid from aluminum oxid.

Complete nitrification of the aluminum can be obtained when a mass or mixture of aluminum compounds, such as an oxid, and carbon in any suitable form, is heated at a temperature of approximately 1500° centigrade, in the presence of carbon monoxid, or carbon monoxid and hydrogen, commercially known as water gas, under which circumstances, the aluminum oxid is seemingly changed into a carbid compound containing less carbon than corresponds to the formula $Al_4C_3$, and then the resulting compounds are converted into nitrids by heating at approximately 1500° to 1600° centigrade, in a current of nitrogen, or a mixture of nitrogen and a reducing gas, such as hydrogen.

The heating of the aluminum compound as described has a tendency to facilitate the subsequent production of nitrids by carrying out the process, so to speak, in two stages; in the first stage there are formed compounds consisting largely of aluminum and carbon, with apparently less carbon than would be represented in the formula, $Al_4C_3$, and there is possibly a formation of metallic aluminum particles, as is evidenced by the fact that the mixture when treated with sodium hydroxid solution before it is subjected to the subsequent treatment with nitrogen evolves hydrogen. It is, however, possible that the reason that the compounds thus formed are more easily subjected to combination with nitrogen lie partly in the fact that the original compound of the formula $Al_2O_3$ is partly reduced to a compound of the formula, AlO, such as described by Winkler. The reactions may be further facilitated and aided by the employment of a carrying agent capable of combining with nitrogen, and, preferably, one which may combine with nitrogen in more than one proportion.

A variation of the process consists in heating the resulting mass before it is subjected to the action of nitrogen, for a short time, in a current of carbon dioxid. It appears that through this heating the reduction of the oxygen-containing aluminum compounds is facilitated, and that they are deprived of an additional part of the oxygen which they contain. The carbon dioxid can be derived easily, for instance, from smoke or flue gas, provided it contains no nitrogen, such as is formed when water gas is used, and deprived of the $H_2O$ vapor formed by the combustion, by cooling in any preferred manner.

A desirable way of carrying out the process is substantially as follows: A powdered mixture or mass in about the proportion of one molecule of aluminum oxid to at least six atoms of carbon, and, if preferred, from a half to five per cent. of the weight of the mixture of a carrying agent, for instance, titanium or calcium compounds, or similar compounds reducible by carbon, is heated at a temperature of approximately 1500° centigrade in a current of water gas, which results in a reduction of the aluminum oxid to a product containing more or less carbon in chemical combination with aluminum. The hydrogen of the water gas assists in the formation of the compounds mentioned above and the combined effort of the carbon monoxid and hydrogen is stronger than that of the components used separately or in succession in the same time period. Furthermore, it is more economical to carry out the process in this way than by attempting to use either of the two ingredients separately. This product is then heated in a current of carbon dioxid to effect further reduction either to sub-carbids or metal, which reduction aids the subsequent union with the nitrogen. Then these carbids are changed into nitrids by heating at a temperature of approximately 1500° to 1600° centigrade, in a current of nitrogen or a mixture of nitrogen and a reducing gas, such, for example, as hydrogen.

The employment of the carrying agent aids and facilitates the reaction, that is, the union of the nitrogen with the aluminum, the carrying agent ingredient apparently forming an unstable compound with the nitrogen, and in case a reducing gas is employed, the combination of the carrying-agent with the nitrogen of a higher proportion is reduced by the hydrogen of the gas, facilitating the production of aluminum nitrid.

This process is susceptible of variations with respect to the ingredients employed, the proportion of parts used, and the temperatures maintained, and it is, therefore, to be understood that the invention is not limited and restricted to the precise and exact features of the methods set forth. For example, the carbon monoxid without hydrogen might be used and the step employing the carbon dioxid may be omitted, but I have found that the practice of the process as set forth is a preferred way of utilizing the invention.

I claim:

1. The method of producing nitrogenous compounds of aluminum which consists in heating a mixture of aluminum oxid and carbon in carbon monoxid practically free from nitrogen, and then in a gas containing nitrogen, substantially as described.

2. The method of producing nitrogenous compounds of aluminum which consists in heating a mixture of aluminum oxid and carbon in a gas consisting principally of carbon monoxid and hydrogen, and then in a gas containing nitrogen, substantially as described.

3. The method of producing nitrogenous compounds of aluminum which consists in heating a mixture of aluminum oxid, carbon, and a carrying agent capable of combining with nitrogen, in carbon monoxid practically free from nitrogen, and then in a gas containing nitrogen, substantially as described.

4. The method of producing nitrogenous compounds of aluminum which consists in heating a mixture of aluminum oxid, carbon, and a carrying agent capable of combining with nitrogen, in a gas consisting principally of carbon monoxid and hydrogen, and then in a gas containing nitrogen, substantially as described.

5. The method of producing nitrogenous compounds of aluminum which consists in heating a mixture of aluminum oxid, carbon, and a carrying agent capable of combining with nitrogen in more than one proportion, in carbon monoxid, and then in a gas containing nitrogen and hydrogen, the combination of the carrying agent and nitrogen of a higher proportion being reduced by the hydrogen, substantially as described.

6. The method of producing nitrogenous compounds which consists in heating a mixture of carbon and of the material to be combined with the nitrogen, in carbon monoxid, then in carbon dioxid, and then in a gas containing nitrogen, substantially as described.

7. The method of producing nitrogenous compounds which consists in heating a mixture of aluminum oxid and carbon, in carbon monoxid, then in carbon dioxid, and then in a gas containing nitrogen, substantially as described.

8. The method of producing nitrogeous compounds which consists in heating a mixture of aluminum oxid and carbon, in a gas consisting principally of carbon monoxid and hydrogen, then in carbon dioxid, and then in a gas containing nitrogen, substantially as described.

9. The method of producing nitrogenous compounds which consists of heating a mixture of the material to be combined with the nitrogen, carbon, and a carrying agent capable of combining with nitrogen, in carbon monoxid, then in carbon dioxid, and then in a gas containing nitrogen, substantially as described.

10. The method of producing nitrogenous compounds which consists in heating a mixture of the material to be combined with the nitrogen, carbon, and a carrying agent capable of combining with the nitrogen, in a gas consisting principally of carbon monoxid and hydrogen, then in carbon dioxid, and then in a gas containing nitrogen, substantially as described.

11. The method of producing nitrogenous compounds of aluminum which consists in heating a mixture of aluminum oxid, carbon, and a carrying agent capable of combining with nitrogen, in carbon monoxid, then in carbon dioxid, and then in a gas containing nitrogen, substantially as described.

12. The method of producing nitrogenous compounds of aluminum which consists in heating a mixture of aluminum oxid, carbon, and a carrying agent capable of combining with nitrogen, in a gas consisting principally of carbon monoxid and hydrogen, then in carbon dioxid, and then in a gas containing nitrogen, substantially as described.

13. The method of producing nitrogenous compounds which consists in heating a mixture of aluminum oxid, carbon, and a carrying agent capable of combining with nitrogen in more than one proportion, in carbon monoxid, then in carbon dioxid, and then in a gas containing nitrogen, substantially as described.

14. The method of producing nitrogenous compounds which consists in heating a mixture of aluminum oxid, carbon, and a carrying agent capable of combining with nitrogen in more than one proportion, in a gas consisting principally of carbon monoxid and hydrogen, then in carbon dioxid, and then in a gas containing nitrogen, substantially as described.

15. The method of producing nitrogenous compounds of aluminum which consists in heating a mixture in the proportion of one molecule of aluminum oxid to not less than six atoms of carbon, in a current of carbon monoxid at a temperature of approximately 1500° centigrade, and then subjecting it to the action of nitrogen, substantially as described.

16. The method of producing nitrogenous compounds of aluminum which consists in heating a mixture in the proportion of one molecule of aluminum oxid to not less than six atoms of carbon, in a current of gas consisting principally of carbon monoxid and hydrogen at a temperature of approximately 1500° centigrade, and then subjecting it to the action of nitrogen, substantially as described.

17. The method of producing nitrogenous compounds of aluminum which consists in heating a mixture in approximately the proportion of one molecule of aluminum oxid to not less than six atoms of carbon and containing a carrying-agent capable of combining with nitrogen, in a current of carbon monoxid at a temperature of approximately 1500° centigrade and then subjecting it to the action of nitrogen, substantially as described.

18. The method of producing nitrogenous compounds of aluminum which consists in heating a mixture of approximately the proportion of one molecule of aluminum oxid to not less than six atoms of carbon, and containing a carrying agent capable of combining with nitrogen in a current of gas consisting principally of carbon monoxid and hydrogen, at a temperature of approximately 1500° centigrade, and then subjecting it to the action of nitrogen, substantially as described.

19. The method of producing nitrogenous compounds of aluminum which consists in heating a mixture in approximately the proportion of one molecule of aluminum oxid to not less than six atoms of carbon, and containing a carrying agent capable of forming an unstable compound with nitrogen, in a current of gas consisting principally of carbon monoxid at a temperature of approximately 1500° centigrade, and then subjecting the mass to a mixture of carbon dioxid, and then to a gas containing nitrogen, substantially as described.

20. The method of producing nitrogenous compounds of aluminum which consists in heating a mixture in approximately the proportion of one molecule of aluminum oxid to not less than six atoms of carbon, and containing a carrying agent capable of forming an unstable compound with nitrogen, in a current of gas consisting principally of carbon monoxid and hydrogen at a temperature of approximately 1500° centigrade and then subjecting the mass to a current of carbon dioxid, and then to a gas containing nitrogen, substantially as described.

21. The method of producing nitrogenous compounds of aluminum which consists in heating a mixture in approximately the proportion of one molecule of aluminum oxid to not less than six atoms of carbon, and containing a carrying agent capable of combining with nitrogen in more than one proportion, in a current of carbon monoxid at a temperature of approximately 1500° centigrade, and then in a gas containing nitrogen, substantially as described.

22. The method of producing nitrogenous compounds of aluminum which consists in heating a mixture in approximately the proportion of one molecule of aluminum oxid to not less than six atoms of carbon, and containing a carrying agent capable of combining with nitrogen in more than one proportion, in a current of gas consisting principally of carbon monoxid and hydrogen at a temperature of approximately 1500° centigrade, and then in a gas containing nitrogen, substantially as described.

23. The method of producing nitrogenous compounds of aluminum, which consists in heating a mixture in approximately the proportion of one molecule of aluminum oxid to not less than six atoms of carbon, and containing a carrying agent capable of combining with nitrogen in more than one proportion, in a current of gas consisting principally of carbon monoxid and hydrogen, at a temperature of approximately 1500° centigrade, then in carbon dioxid, and then in a gas containing nitrogen, substantially as described.

PAUL RALPH HERSHMAN.